United States Patent
Lam

(10) Patent No.: US 6,349,326 B1
(45) Date of Patent: Feb. 19, 2002

(54) COMPUTER NETWORK READ-AHEAD CACHING METHOD

(76) Inventor: Roger Kin-Hung Lam, 22 Fairway Dr., Daly City, CA (US) 94015

(*) Notice: Subject to any disclaimer, the term of this patent is extended or adjusted under 35 U.S.C. 154(b) by 0 days.

(21) Appl. No.: 09/772,696

(22) Filed: Jan. 30, 2001

Related U.S. Application Data

(62) Division of application No. 09/120,951, filed on Jul. 22, 1998, now Pat. No. 6,249,804.

(51) Int. Cl.[7] .............................................. G06F 13/00
(52) U.S. Cl. ..................................................... 709/203
(58) Field of Search ................................ 709/200, 202, 709/203, 235; 707/2, 5; 711/113, 118, 121, 126, 133, 137

(56) References Cited

U.S. PATENT DOCUMENTS 6,098,064 A * 8/2000 Pirolli et al. ..................... 707/2

OTHER PUBLICATIONS

2 Web pages for NetAccelerator software by IMSI, 1998.
3 Web pages titled "Overview of Got It!" for Got It! software by Go Ahead Software, undated.
7 Web pages titled "How Go Ahead Got It! works" for Got It! software by Go Ahead Software, undated.
5 Web pages titled "Go Ahead Got It! Enterprise Online Brochure" for Got It! software by Go Ahead Software, 1998.

* cited by examiner

*Primary Examiner*—Robert B. Harrell
(74) *Attorney, Agent, or Firm*—Jack Lo

(57) ABSTRACT

A computer network read-ahead caching method for servers and clients includes compiling a list of addresses associated with the links on a page. The addresses are ordered on the list according to the likelihood that they may be visited by a user. Different compiling methods are provided, including compiling in the order the links appear on the page, compiling only the links which are currently displayed to the user, and compiling currently displayed links and links in the direction the page is being scrolled. Requests are send out to the addresses which are not in a local cache. Any cacheable pages which are received are cached. If the page for the selected link is already cached, it is fetched from the cache and displayed almost instantly, so that the user does not experience the download delay. If the page is not cached, a request is sent out. In another embodiment, the requests identify the client as a read-ahead caching client, and the responses identify the server as a compatible server. Under predetermined conditions, the server sends a regulating response to the client to regulate its read-ahead caching. The client may comply with the regulating response if the server is a compatible server, otherwise the client may ignore the regulating response.

16 Claims, 3 Drawing Sheets

COMPUTER NETWORK READ-AHEAD CACHING METHOD

CROSS REFERENCE TO RELATED APPLICATIONS

I claim the benefit of a prior divisional application with Ser. No. 09/120,951 which was filed on Jul. 22, 1998, now U.S. Pat. No. 6,249,804.

BACKGROUND OF THE INVENTION

1. Field of the Invention

This invention relates generally to the caching of Internet pages.

2. Prior Art

Information on the Internet is represented by files stored in computers running programs called servers, and is accessed by users with computers running computer programs called clients. The Internet includes several different services, the most popular being the World Wide Web, which is often simply referred to as the Web. Information on the Web is provided by Web servers. A client called a Web browser is usually used for accessing the Web, but there are other tools that can be used. Many Web browsers can also access other services on the Internet, such as FTP (File Transfer Protocol) and Gopher.

Information on the Web are currently represented by specially formatted text files called Web pages, each of which is a text document written in HTML (Hypertext Markup Language) or another language, such as XML, HDML, VRML, etc. Each page has a Web address called an URL (Universal Resource Locator). A typical page also includes hyperlinks, which are either underlined text or graphical images that point to the addresses of other pages, so that when one is clicked or selected, a request will be sent out for the associated page. E.g., when the Products hyperlink in a merchant's home page is selected, a request is sent out by the client to the address specified in the hyperlink, and the associated Web page is downloaded and displayed, replacing the home page on the user's screen with a new page showing the merchant's products. A hyperlink may simply be referred to as a link.

Browsers or clients typically use a communication protocol called HTTP (Hypertext Transfer Protocol) to request pages from Web servers. HTTP is a request/response protocol. Through a connection established between a client and a server, a request is send by the client to the server, and a response is provided by the server to the client. Due to the vastness and complexity of the Internet, there are usually intermediaries between the client and the origin server, which is the server that the request is intended for. Typically, a request generated by a client is relayed to the origin server by one or more other servers, such as proxy servers and gateways. A proxy server is an intermediary program which acts as a server for receiving requests from clients, and also as a client for forwarding the requests onto other servers. A gateway is also an intermediary, but it receives requests as if it is the origin server. Any server that only passes along a request is called tunnel. Many servers store files that pass through them temporarily in a local store called a cache. Except for tunnels, a response to a request could be returned by any intermediary server if the file being requested is in its cache.

A frustrating aspect of using the Internet is the long delays associated with downloading pages from the Web or other services. Therefore, a cache is also typically implemented by a client. Whenever a page is received by the client, it is stored in the cache. Some pages are cacheable, i.e., they are identified as being allowed in the cache according to various parameters, whereas other pages are not cacheable, After prolonged Internet use, the cache would be filled with a very large number of pages. When a page is requested by the client, such as by clicking on a link, a hit test is first performed on the cache, i.e., the cache is checked for the presence of the page. If there is a hit and the cache is valid (e.g.., not expired), the page is fetched from the cache, so that it is displayed almost instantly, and the user is spared from downloading the page through the slow communication link. If there is a hit with an invalid respond, there is no hit, or the client does not maintain a cache, a request is sent by the client to the origin server. When the request is received by an intermediary server, such as a proxy server, a hit test will be performed on its cache. If there is a hit with a valid response, the requested page is sent by the intermediary server to the client. The response is treated by the client as if it is sent by the origin server, so that the request is fulfilled. If there is a hit with an invalid response (e.g., page has expired), there is no hit, or the intermediary server does not maintain a cache, the request is forward to another server. A cache has a finite capacity for storing pages, so that older pages are constantly being replaced by more recently received pages. Some pages show frequently updated information, such as stock quotes or weather, so a code is included in these pages to prevent them from being cached, i.e., they are not cacheable.

Any server between the client and the origin server, other than a tunnel, that implements caching can respond to a request if its cache can provide a valid response. When the requested file is found and passed to the client, any server other than a tunnel may save a copy of it into its cache if the page is cacheable. When a requested page is received by the client, it will be displayed and also saved to the client's cache if it is cacheable. The client will wait for the user to select another link or enter another address before generating another request.

Due to the vast number of pages available on the Web, a requested page is not likely to be cached by the client or any server along the connection, unless the page was recently visited by the user. Therefore, most of the time when a link is clicked and the associated page is requested, the user has to wait for the page to be downloaded. The downloading time can typically range from several seconds to over a minute. Much of the Web surfing experience is thus comprised of a great deal of waiting for pages to be downloaded.

Most proxy servers implement a caching mechanism very similar to that employed by clients. Since a proxy server serves many clients, its cache is usually very large and the caching scheme is elaborate. However, the basic principle of a proxy's caching mechanism is the same, i.e., return a page to a client if there is a valid response from proxy's cache, otherwise forward the request to another server, and when the response is received, save it in the cache and also forward it to the client.

When a user is reading a Web page with a client, the processor and communication modules are idle, and simply waiting for the user to clink on another link. Such wasted processing and communicating capabilities are put to use by some products, such as a browser plug-in sold under the trademark "NETACCELERATOR" by IMSI. When a user is reading a page and not clicking on any link, the addresses specified by the links on the page are automatically contacted and their associated pages downloaded into a cache by "NETACCELERATOR." Because these pages are downloaded while user is occupied with reading the displayed page, their associated downloading times are transparent to the user. Theoretically, when a link on the displayed page is eventually clicked by the user, the associated page is already cached, so that it will be displayed almost instantly, and the downloading time is not experienced by the user. However, many Web pages contain a large number of links. Caching all the pages associated with all the links can take many minutes or even hours, which may be much longer than the time spent by the user on the original page. As a result, the pages for some links may not yet be cached, so that the user will still experience downloading time for such links. No information is disclosed by IMSI about the particular order, if any, that the pages are downloaded. Therefore, its caching scheme may not be the most efficient.

A product sold under the trademark "GOT IT!" by Go Ahead Software is also a client plug-in for downloading pages associated with links on a Web page. Another product sold under the trademark "GOT IT! ENTERPRISE" by Go Ahead Software is for downloading pages to local servers. No information is disclosed by Go Ahead Software about the particular order, if any, that the pages are downloaded by either product. Therefore, their caching schemes may not be the most efficient. These prior art read-ahead caching programs will initially benefit individual users. However, if they are used by a large number of users, they can overload the Internet with a hugely increased number of requests, so that all users will end up suffering even greater delays.

OBJECTS OF THE INVENTION

Accordingly, several objects of the present computer network read-ahead caching method are:

to enable a server and a client to cache pages associated with the links on a Web page to reduce or eliminate the waiting time experience by a user when the links are accessed;

to order requests for the pages according to the likelihood that the pages may be requested by the user, so as to maximize the likelihood that a page will be in the cache when requested;

to cache pages specified by links on already cached pages, i.e., to perform multi-level read-ahead caching; and to enable the server to regulate the read-ahead caching of the client for maximizing communicating efficiency.

Further objects of the present invention will become apparent from a consideration of the drawings and ensuing description.

BRIEF SUMMARY OF THE INVENTION

A computer network read-ahead caching method for servers and clients includes compiling a list of addresses associated with the links on a page. The addresses are ordered on the list according to the likelihood that they may be visited by a user. Different compiling methods are provided, including compiling in the order the links appear on the page, compiling only the links which are currently displayed to the user, and compiling currently displayed links and links in the direction the page is being scrolled. Requests are send out to the addresses which are not in a local cache. Any cacheable pages which are received are cached. If the page for the selected link is already cached, it is fetched from the cache and displayed almost instantly, so that the user does not experience the download delay. If the page is not cached, a request is sent out. In another embodiment, the requests identify the client as a read-ahead caching client, and the responses identify the server as a compatible server. Under predetermined conditions, the server sends a regulating response to the client to regulate its read-ahead caching. The client may comply with the regulating response if the server is a compatible server, otherwise the client may ignore the regulating response.

DETAILED DESCRIPTION OF THE INVENTION

Figure 1:
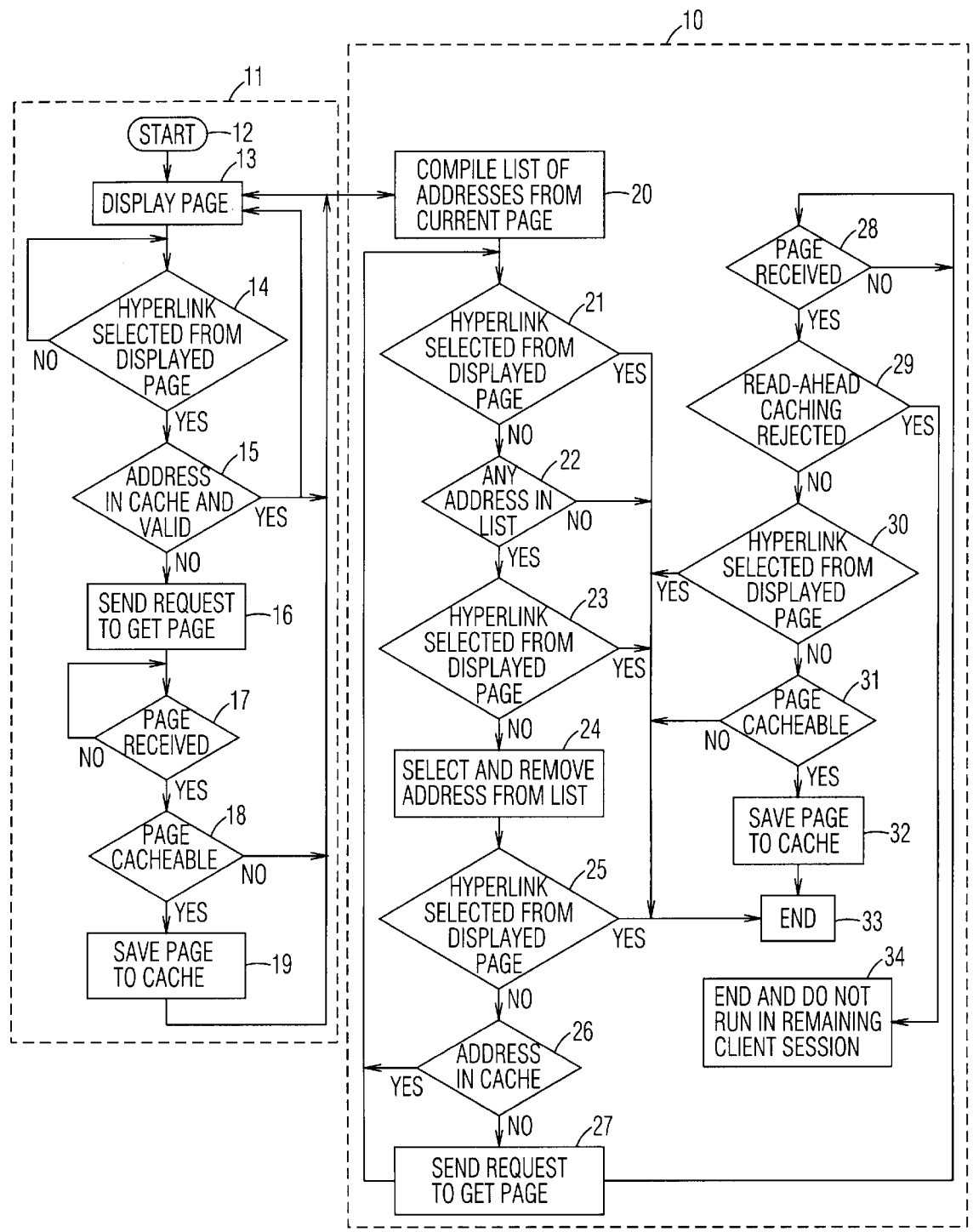
FIG. 1 is a flowchart of a first embodiment of the present computer network read-ahead caching method.

FIG. 1:

As shown in the flowchart in FIG. 1, a first embodiment of the present invention is comprised of a client read-ahead caching system 10 cooperating with a client 11. Client read-ahead caching system 10 may be provided as a plug-in, i.e., an add-on program to client 11, or it may be an integral part of client 11. As an example, client read-ahead caching system 10 may be written as a Windows or Unix program respectively running on an Intel-based personal computer or RISC workstation.

After client 11 is started at block 12, an Internet page, e.g., a Web page, is displayed at block 13 by entering or selecting a corresponding Web address, although a default address may be used. The process is looped at block 14 until a link is selected by a user. If the address for the selected link is in a local cache and valid at block 15, the associated page is fetched from the cache and displayed at block 13, replacing the previously displayed page. Any type of file with its own Internet address, including HTML documents, executables, graphics, etc., may be considered as a page in this invention. If the address is not in the cache, a request for the page specified by the link is sent out at block 16 by client 11. The process is looped at block 17 until the requested page is received. When the requested page is received, but it is identified as not cacheable at block 18, the received page is displayed at block 13 but not saved to cache. If the received page is cacheable at block 18, it is saved to cache at block 19, and displayed at block 13, replacing the previously displayed page.

Whenever a page is being received or has been received, client read-ahead caching system 10 is started as soon as the processor and communication module become available or idle, such as when the user is reading the displayed page without selecting the links on it. A list of the address specified by the links, if any, on the displayed page is complied at block 20. Some pages include multiple links with the same address, so duplicate addresses on the list are eliminated. Client 11 and client read-ahead caching system 10 are preferably concurrently run by a suitable multitasking operating system, so that a page can be displayed and multiple other pages downloaded at the same time.

If a link on the displayed page is not selected at block 21, the list is checked for whether there is any address on it at block 22. If no address is on the list, client read-ahead caching system 10 is ended at block 33. If a link on the displayed page is not selected by the user at block 23, an address on the list is selected by the system and removed from the list at block 24. If a link on the displayed page is not selected by the user at block 25, the address selected by the system is check for its presence in the local cache at block 26, i.e., a hit test is performed. If it is already in the cache, i.e., if there is a hit, the process is repeated from block 21 for the next address.

If the address is not in cache at block 26, a request is sent out at block 27. The process is simultaneously repeated at block 21 for the next address while the system is waiting to receive the requested page, i.e., requests are sent out in the sequence in which the addresses are compiled on the list at the same time the pages are being downloaded. The process is looped at block 28 until the requested page is received. If the read-ahead caching request is rejected by the server at block 29, client read-ahead caching system 10 is ended at block 34, and is not restarted in the remaining client session. If the read-ahead caching request is not rejected at block 29, a link is not selected at block 30, and the page is cacheable at block 31, the page is saved to cache at block 32, and client read-ahead caching system is ended at block 33. If the page is not cacheable at block 31, the process is ended at block 33. If at any time during read-ahead caching a link on the displayed page is selected by the user at blocks 21, 23, 25, or 30, client read-ahead caching system 10 is ended at block 33. When the next page is displayed, client read-ahead caching system 10 is started again for the newly displayed page. Alternatively, read-ahead caching may be continued from where it was interrupted on the previous page, or continued at the link following the selected link on the previous page.

Requests are thus automatically sent to the addresses specified by the links on a displayed page, and the associated pages are transparently downloaded and saved to cache. When a link on the displayed page is selected by the user, the associated page for the selected link may already have been saved to cache, so the page may be fetched from the cache and displayed almost instantly. When a new page is displayed, the client read-ahead caching system is restarted for it.

A code is preferably included in each request to identify it as a read-ahead caching request, so that a compatible server may handle the request accordingly. E.g., the code may be included in the User Agent header defined in the HTTP 1.1 protocol. The code may be readily identifiable to any conventional server, e.g., it may be the trademark of the client. Alternatively, it may be identifiable only to a compatible server programmed to identify it, so that the read-ahead caching request cannot be identified as such by incompatible servers, and the request is prevented from being rejected by incompatible servers.

The addresses on a displayed page may be compiled on the list in the order they appear on the page, e.g., from top to bottom in the HTML text file. However, due to the limited interval between user initiated requests, not all the pages may be downloaded in time. Therefore, the addresses on the list are preferably ordered according to the likelihood that the pages may be requested by the user, i.e., the pages for the links which are most likely to be selected by the user are requested first, e.g., according to the following alternative systems:

1. Include only the addresses for the links which are displayed to the user, e.g., when a large page is partially displayed.
2. Include only the addresses for the links which are displayed to the user, and order those in the middle of the displayed area ahead of those that are farther away.
3. Include only the addresses for the links which are displayed to the user, and also the addresses for the links in an area adjacent to the displayed area. The adjacent area is above the displayed area when the user is scrolling up or has recently scrolled up. The adjacent area is below the displayed area when the user is scrolling down or has recently scrolled down.

The adjacent area is below the displayed area when the very top of the page is displayed. The adjacent area is above the displayed area when the very bottom of the page is displayed.

After read-ahead caching for the displayed page is finished and the processor and communication module are available, multilevel read-ahead caching may be performed on other pages. Alternative multilevel read-ahead caching systems may comprise sending requests to the addresses on the cached pages which are not displayed, or sending requests to the addresses on previously displayed pages.

Figure 2:
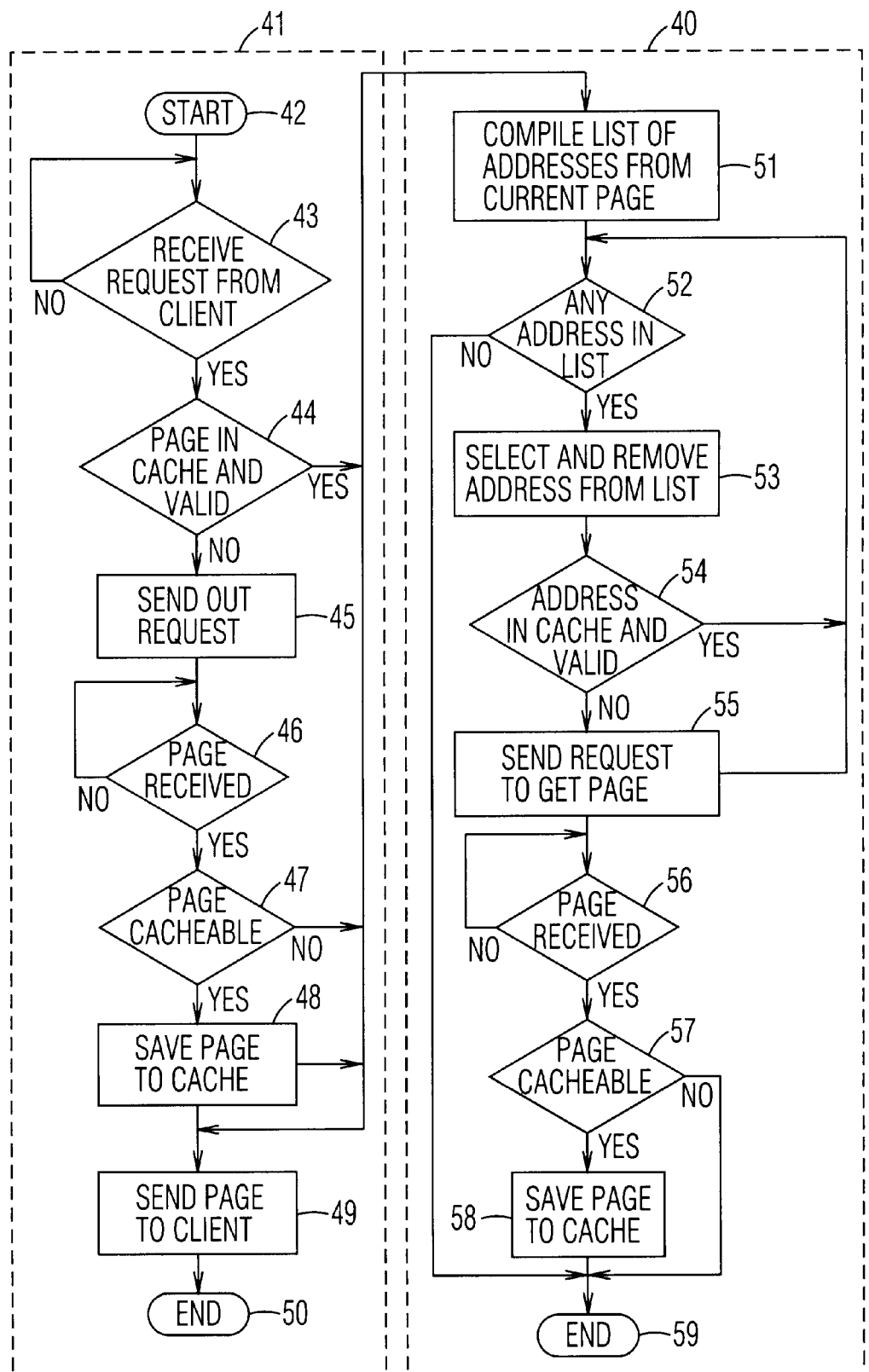
FIG. 2 is a flowchart of a second embodiment of the read-ahead caching method.

FIG. 2:

As shown in the flowchart in FIG. 2, a second embodiment of the present invention is comprised of a server read-ahead caching system 40 cooperating with a server 41, which in this example is a proxy server, but may be any other type of server. Server read-ahead caching system 40 may be provided as a plug-in, or it may be an integral part of server 41.

After starting at block 42, the process is looped at block 43 until a request is received from a client. If the requested page is in a local cache at block 44, the page is sent to the client at block 49, and server read-ahead caching system 40 is simultaneously started for the page. If the requested page is not in the server's local cache at block 44, the request is forwarded to another server at block 45. The process is looped at block 46 until the page is received. If the received page is not cacheable at block 47, it is sent to the client at block 49, and server read-ahead caching system 40 is simultaneously started for the page. If the received page is cacheable at block 47, the page is saved to cache at block 48, sent to the client at block 49, and server read-ahead caching system 40 is simultaneously started for the page. The process is ended at block 50.

Whenever server read-ahead caching system 40 is started, a list of the addresses on the forwarded page is compiled at block 51. Some pages include multiple links with the same address, so duplicate addresses on the list are eliminated. If there is no address on the list, i.e., there is no link on the displayed page, server read-ahead caching system 40 is ended at block 59.

If there is one or more addresses on the list, an address on the list is selected and removed at block 53. If the selected address is in cache and valid at block 54, the process is returned to block 52, and the next address, if any, on the list is selected. If the selected address is not in cache at block 54, a request is send out for the page at block 55, and the process is simultaneously returned to block 52 for the next address, if any. The process is looped at block 56 until the requested page is received. If the received page is not cacheable at block 57, the process is ended at block 59. If the received page is cacheable at block 57, it is saved to cache at block 58, and the process is ended at block 59.

After the client initiated request at block 43 is responded to by server 41, server read-ahead caching is begun as soon as the processor and communication module are available. Pages received through server read-ahead caching is saved in the server's cache, but not forward to other computers. When another client initiated request is received, the requested page might already be saved in cache. If the client is connected to server 41 through a high speed network, such as in a typical office environment, the cached page will be supplied to the client very quickly. If the requested page is not in cache, a request is sent out by server 41 to other servers. If a new client initiated request is received while server read-ahead caching is being performed, server read-ahead caching is preferably suspended and the new request is handled. After the new page is forwarded to the client, server read-ahead caching may be resumed from where read-ahead caching on the previous page was interrupted, or at the link following the selected link on the previous page.

After read-ahead caching for the forwarded page is finished and the processor and communication module are available, multilevel read-ahead caching may be performed on other pages. Alternative multilevel read-ahead caching systems may comprise sending requests to the addresses on all cached pages, or sending requests to the addresses on read-ahead cached pages.

Figure 3:
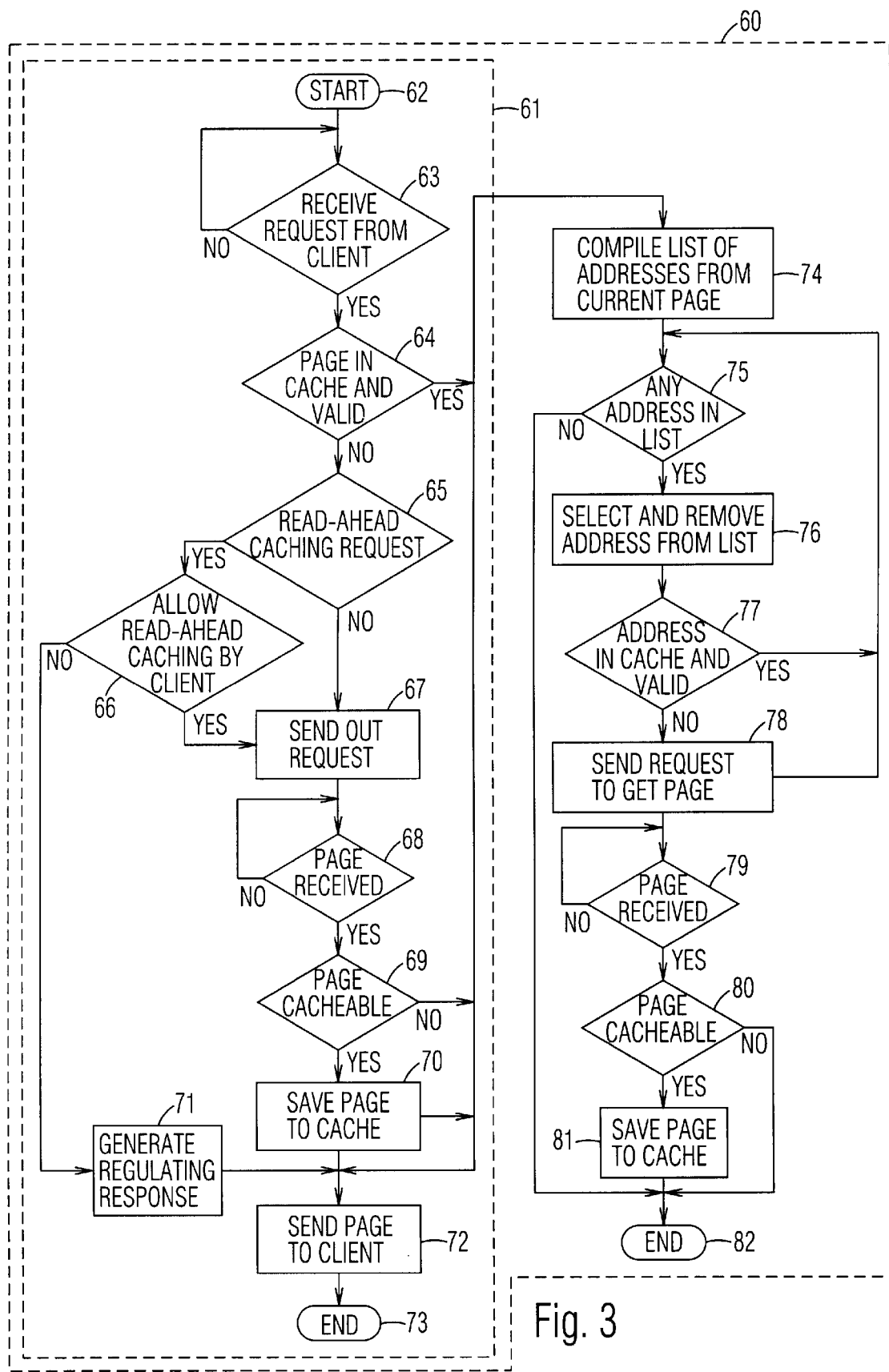
FIG. 3 is a flowchart of a third embodiment of the read-ahead caching method.

FIG.3:

As shown in the flowchart in FIG. 3, a third embodiment of the present invention is comprised of a server read-ahead caching system 60 which includes a server 61. After starting at block 62, the process is looped at block 63 until a request is received. If the requested page is in the server's local cache at block 64, the page is sent to the client at block 72, and server read-ahead caching is started for the page at block 74. If the requested page is not in the local cache at block 64, and the request is not identified as a read-ahead caching request at block 65, the request is forwarded at block 67. If the request is identified as a read-ahead caching request at block 65, server 61 may determine whether to allow read-ahead caching by the client at block 66 according to any desired parameter, such as the server's available bandwidth. If the read-ahead caching request is allowed at block 66, it is forwarded to other servers at block 67, otherwise a regulating response is generated and sent to the client at block 71.

If the request is forwarded at block 67, the process is looped at block 68 until the page is received. If the received page is not cacheable at block 69, it is sent to the client at block 72, and server read-ahead caching is started for the page at block 74. If the received page is cacheable at block 69, the page is saved to cache at block 70, sent to the client at block 72, and server read-ahead caching is simultaneously started for the page at block 74. The server process is ended at block 73.

The regulating response may be provided in any suitable form, e.g., as a code in the Respond Server header defined in the HTTP 1.1 protocol. The regulating response may include any instruction for regulating the actions of the client, including the following different instructions:

1. Informing the client that read-ahead caching is not allowed by the server.
2. Instructing the client to stop read-ahead caching.
3. Informing the client that it may start read-ahead caching.
4. Instructing the client to delay read-ahead caching until after a specified time delay.
5. Informing the client that one or more previous requests of the client were ignored by the server.
6. Informing the client that read-ahead caching requests for pages in predetermined categories, such as certain Webs sites, are ignored or not allowed.
7. Informing the client the status of the server such as its activity (how busy), bandwidth, communication properties, etc.
8. Instructing the client to limit the number of requests or number of outstanding requests.
9. Instructing the client to limit the number of requests or number of outstanding requests in a specified time interval.

Further, a code may be included in the regulating response identifying the server as a compatible server. The client may be programmed to cooperate with a compatible server. If the regulating response is generated by a non-compatible server, the client may be programmed to ignore the regulating response and continue read-ahead caching.

Whenever server read-ahead caching is started, a list of the addresses on the forwarded page is compiled at block 74. Some pages include multiple links with the same address, so duplicate addresses on the list are eliminated. If there is no address on the list, i.e., there is no link on the displayed page, server read-ahead caching is ended at block 82. If there is one or more addresses on the list, an address on the list is selected and removed at block 76. If the selected address is in cache and valid at block 77, the process is returned to block 75, and the next address, if any, on the list is selected. If the selected address is not in cache at block 77, the request is forwarded at block 78, and the process is simultaneously returned to block 75 for the next address, if any. The process is looped at block 79 until the requested page is received. If the received page is not cacheable at block 80, the read-ahead caching process is ended at block 82. If the received page is cacheable at block 80, it is saved to cache at block 81, and the process is ended at block 82.

SUMMARY AND SCOPE

Accordingly, a computer network read-ahead caching method is provided. It enables servers and clients to cache pages associated with links on a Web page to reduce or eliminate the waiting time experience by a user when the links are accessed. It orders requests for the pages according to the likelihood that the pages may be requested by the user, so as to maximize the likelihood that a page may be in the cache when requested. It caches pages specified by links on already cached pages, i.e., it performs multi-level read-ahead caching. It also enables the server to regulate the read-ahead caching of the client.

Although the above description is specific, it should not be considered as a limitation on the scope of the invention, but only as an example of the preferred embodiment. Many substitutes and variations are possible within the teachings of the invention. For example, the read-ahead caching method can be written in any suitable computer language for any suitable operating system and any hardware platform. It may be a program separate from others, or it can be an integral part of other programs. It can be applied to any Internet service that can use caching, including but not limited to the World Wide Web, FTP (File Transfer Protocol), Gopher, etc. It can also be applied to any other type of computer network in addition to the Internet. Therefore, the scope of the invention should be determined by the appended claims and their legal equivalents, not by the examples given.

I claim:

1. A computer network server read-ahead caching method, comprising:

receiving a read-ahead caching request from a client;

fulfilling said read-ahead caching request when a predetermined condition is met; and sending a regulating response to said client regulating read-ahead caching operation of said client when said predetermined condition is not met.

2. The computer network server read-ahead caching method of claim 1, further including informing said client in said regulating response that said read-ahead caching operation is disallowed by said server.

3. The computer network server read-ahead caching method of claim 1, further including instructing said client in said regulating response to stop said read-ahead caching operation.

4. The computer network server read-ahead caching method of claim 1, further including instructing said client in said regulating response to begin said read-ahead caching operation.

5. The computer network server read-ahead caching method of claim 1, further including instructing said client in said regulating response to delay said read-ahead caching operation until after a specified time delay.

6. The computer network server read-ahead caching method of claim 1, further including informing said client in said regulating response that a previous read-ahead caching request of said client was ignored by said server.

7. The computer network server read-ahead caching method of claim 1, further including instructing said client in said regulating response that any read-ahead caching request for information in a predetermined category is disallowed.

8. The computer network server read-ahead caching method of claim 1, further including informing said client in said regulating response of a communication status of said server.

9. The computer network server read-ahead caching method of claim 1, further including informing said client in said regulating response of a maximum allowable number of read-ahead caching requests.

10. The computer network server read-ahead caching method of claim 1, further including informing said client in said regulating response of a maximum allowable number of read-ahead caching requests in a specified time interval.

11. A computer network read-ahead caching method, comprising:

providing a client;

sending a request with said client;

identifying said client in said request as a read-ahead caching client;

providing a server;

receiving said request with said server;

fulfilling said request with said server when a predetermined condition is met;

sending a regulating response to said client with said server when said predetermined condition is not met, said regulating response regulating read-ahead caching operation of said client; and identifying said server in said regulating response as a compatible server, said client cooperating with a response from any server identified as said compatible server to maximize communication efficiency, said client not cooperating with said response from any server not identified as said compatible server so as to continue with said read-ahead caching operation.

12. The computer network read-ahead caching method of claim 11, further including instructing said client in said regulating response to stop said read-ahead caching operation.

13. The computer network read-ahead caching method of claim 11, further including instructing said client in said regulating response to delay said read-ahead caching operation until after a specified time delay.

14. The computer network read-ahead caching method of claim 11, further including instructing said client in said regulating response that any read-ahead caching request for information in a predetermined category is disallowed.

15. The computer network read-ahead caching method of claim 11, further including informing said client in said regulating response of a maximum allowable number of read-ahead caching requests.

16. The computer network read-ahead caching method of claim 11, further including informing said client in said regulating response of a maximum allowable number of read-ahead caching requests in a specified time interval.

* * * * *